MAGNETIC COUPLING HAVING A MAGNETIC BEARING

Filed Aug. 1, 1961 4 Sheets-Sheet 1

Oct. 15, 1963 R. L. CARRIERE ET AL 3,107,310

MAGNETIC COUPLING HAVING A MAGNETIC BEARING

Filed Aug. 1, 1961 4 Sheets-Sheet 3

Oct. 15, 1963 R. L. CARRIERE ETAL 3,107,310

MAGNETIC COUPLING HAVING A MAGNETIC BEARING

Filed Aug. 1, 1961 4 Sheets-Sheet 4

3,107,310
MAGNETIC COUPLING HAVING A MAGNETIC BEARING

Raymond Lucien Carrière, Robert de Saint Vaulry, and Henri Fehr, all of Paris, France, assignors to Compagnie de Construction Mecanique-Procedes Sulzer, Paris, France Filed Aug. 1, 1961, Ser. No. 128,528
Claims priority, application France Aug. 3, 1960
10 Claims. (Cl. 310—103)

The present invention relates to a rotor mounting device for a rotating machine, comprising a centering magnetic induction circuit, coaxial with and adjacent to the rotor, means for producing a magnetic flux in said centering magnetic induction circuit, provided on its transversal side adjacent the rotor with pole pieces consisting of two concentric rims, vis. an internal and an external rim, said rotor having on its transversal side facing said centering magnetic induction circuit a magnetic circuit including two concentric internal and external rims, located opposite the corresponding pole rims of the centering magnetic induction circuit, each one of said centering magnetic induction and rotor rims being comprised of a plurality of concentric sharp-edged ribs, in such a manner that the magnetic flux produced in the centering magnetic induction circuit closes through the magnetic circuit of the rotor and maintains the latter centered on the axis of the centering magnetic induction circuit.

In order to balance and compensate for the axial attraction force performed on the rotor by the centering magnetic induction circuit, an auxiliary magnetic induction circuit is provided adapted to exert on said rotor an axial force opposite to that performed by the centering magnetic induction circuit.

The magnetic fluxes produced in the centering and auxiliary magnetic induction circuits may be derived either from a permanent magnet, or from an electro-magnet.

The rotor mounting device according to the invention, as used in a rotating machine, enables both the rotor carrying shaft and the conventional bearing to be dispensed with.

By way of example, the device according to the invention will be described and illustrated as applied to magnetic coupling devices. In such coupling devices, one of the rotors, whether the driving or the driven one, is maintained in the centered position by the device of the invention.

In such magnetic couplers, the magnetic flux for centering a particular one of said rotors may also serve for the transmission of the torque. To this end, one of the rotors functions as the centering magnetic induction circuit and has two internal and external rims, respectively, facing the corresponding rims provided on the other rotor. Radial indentations, defining the toothing for the transmission of the torque, are then stamped out in the rims of both rotors.

The application to the magnetic coupling device of the centering device according to the invention, presents the advantage of enabling the transmission of the torque to be effected between the two rotors, through a tight wall, one of the rotor, the driving or driven rotor, being located in a strictly hermetically sealed enclosure, no bearings or lubrication therefor, nor any sealing devices being provided on the shaft, since the latter is dispensed with.

On the other hand, in all applications of the device, on account of the suppression of the rotor carrying shaft and its associated bearings, there is a substantial reduction in the overall bulk of the machine which, in many cases, is of primary importance.

The invention will be best understood from the following description and appended drawings of preferred embodiments of the device, given only by way of non-limitative examples and with particular reference to an electro-magnetic coupling device. In the drawings.

Figure 1:
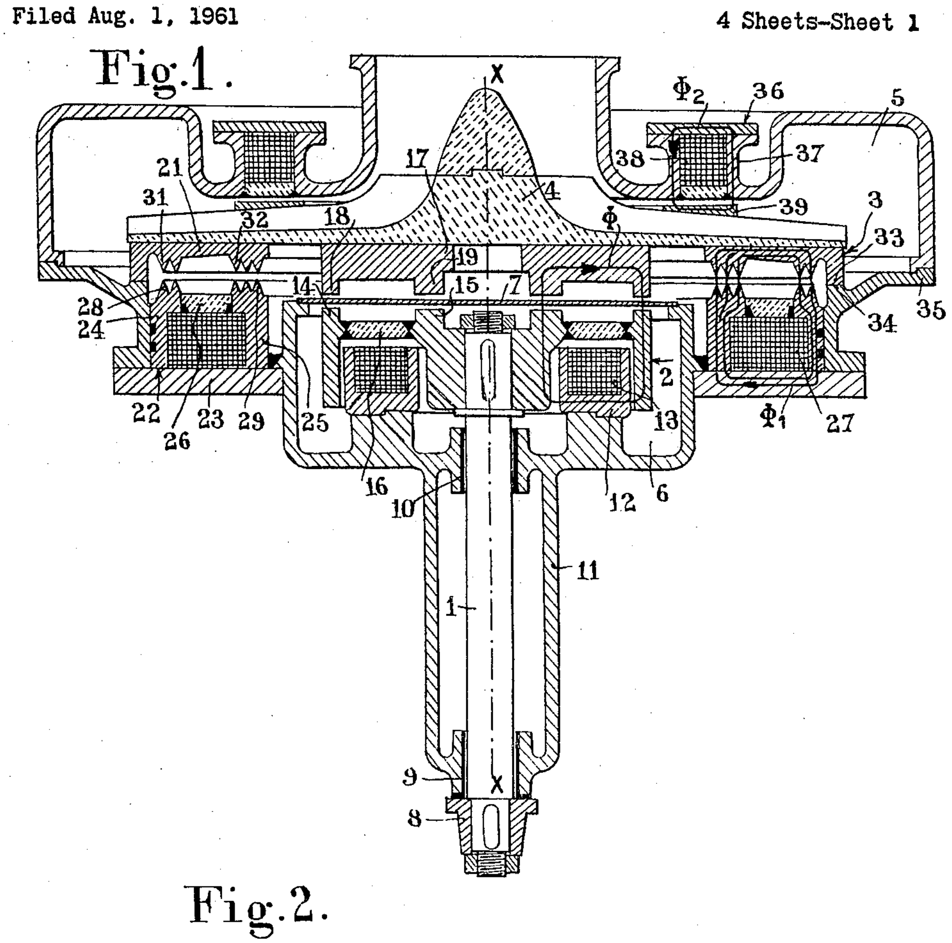
FIGURE 1 is a cross-sectional, longitudinal view of an electro-magnetic coupling device according to the invention.
Figure 2:
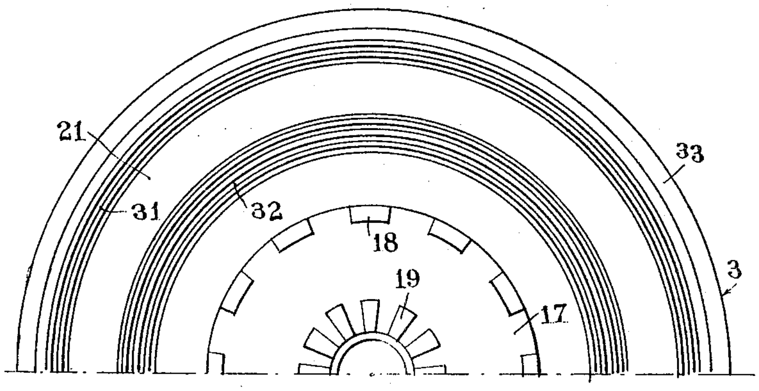
FIGURE 2 is a view of elevation of a half portion of the driven rotor of the coupler shown in FIG. 1.

Referring now more particularly to FIGS. 1 and 2, there is shown a magnetic coupler comprising essentially a driving shaft 1 and a driving rotor 2 integral therewith; and a floating driven rotor 3, integrally connected with the operating member 4 of the driven machine, which, in the example illustrated is a compressor wheel. The driven rotor 3 and the compressor wheel 4 are located in a tightly closed casing 5, bounded by an envelope 35 and separated from a casing 6 enclosing the driving rotor 2 by means of a tight partition 7.

The driving shaft is integral with a thrust collar 8 adapted to transmit to the bearing 9 the axial thrusts to which shaft 1 is subjected. On the other hand, said shaft 1 is guided by a second radial bearing 10, the bearings 9 and 10 being mounted in an envelope 11 where, as mentioned, is also located the driving rotor 2. Envelope 11 carries an annular magnetic induction circuit 12, of U-section wherein a stationary field winding 13 is located, producing the magnetic flux Φ adapted to transmit the torque between the driving rotor 2 and the driven rotor 3. The driving rotor 2 is provided with a first set of teeth 14 arranged around on external rim, and with a second set of teeth 15, arranged around an internal rim thereof. The external and internal teeth rims, 14 and 15, are separated by means of an annular cross member 16 of non-magnetic material.

The driven rotor comprises, on the opposite side of the tight partition 7, and facing the driving rotor 2, a first annular magnetic circuit 17 carrying an external toothed rim 18 and an internal toothed rim 19. The external toothed rims 18 and 14, on one hand, and the internal toothed rims 19 and 25, on the other hand, are mutually facing each other, on each side of the tight partition 7.

Since the coupling device described by way of example is of the synchronous type, the number of the teeth 14 and 15 of the driving rotor 2 is equal to the number of the teeth 18 and 19 of the driven rotor 3. It will be obvious to those skilled in the art that a non-synchronous coupler may be readily built, by providing different numbers of teeth on the driving and driven rotors, respectively.

According to the invention, the driven rotor 3 carries a second annular magnetic circuit 21, coaxial with the first, said magnetic circuit cooperating with a centering magnetic induction circuit 22. This circuit 22 is carried by a portion 23 of the external envelope of the machine and comprises essentially two rings 24 and 25, of magnetic material, interconnected by an annular cross-piece 26, of non-magnetic material, an annular field winding 27 being located between said rings 24 and 25.

These rings 24 and 25 are provided, on their transversal sides facing the driven rotor 3, external and internal pole rims 28 and 29, respectively. The external pole rim 28 is comprised of two circular ribs having sharp edges, while similarly the internal pole rim 29 is comprised of three sharp-edged circular ribs.

In the same way, the second magnetic circuit 21 of the driven rotor 3 presents two rims, an external 31 and an internal 32. These rims 31 and 32 are comprised, as the previous ones, of two or three circular sharp-edged ribs. The ribs of the rims 31 and 32 are of the same diameter, have the same pitch and show the same distribution pattern as the ribs of the corresponding rims 28 and 29 and are facing the latter.

The centering of the driven rotor 3 is produced by energizing the field winding 27, which generates a magnetic flux $\Phi_1$ which closes, through rings 24 and 25, the second magnetic circuit 21 of rotor 3 and the portion 23 of the outer envelope of the machine. The flux $\Phi_1$ is concentrated in the ribs constituting the various external rims 28 and 31, and internal rims 29 and 32, thus ensuring a highly accurate positioning of the driven rotor 3 with respect to the longitudinal axis X—X of the machine, so that the overall reluctance of the magnetic circuit is a minimum in this position.

The number of the ribs of the inner and outer rims, respectively, is different since it is required that the passage cross-section offered to the magnetic flux should be constant all along the path of this flux.

The second magnetic circuit 21 of the driven rotor 3 carries, besides, a peripheral cylindrical skirt 33 which rests with its transversal face on a flat, annular bearing area 34 located in envelope 35 housing the driven rotor 3. According to alternative embodiments, within the scope of the invention, said bearing area may have a conical or spherical shape.

Due to the axial attraction forces produced by the magnetic fluxes $\Phi$ and $\Phi_1$, the driven rotor 3 exercises a pressure on area 34. In order to adjust this pressure as desired, an auxiliary magnetic induction circuit 36 has been provided, consisting of an annular shield 37 inside of which there is located a field winding 38 fed by D.C. or a rectified current. The driven rotor 3 carries also a continuous ring 39 of magnetic metal. The flux $\Phi_2$ generated by said auxiliary magnetic induction circuit 36 closes through the continuous ring 39, so that the latter is subjected to an axial attraction force in the direction of said induction circuit 36. This axial attraction force is thus readily adjustable, as desired, by causing the excitation of the field winding 38 to be varied, so as to partly compensate for the pressure exercised by the driven rotor 3 on the bearing area 34.

Referring now to FIGS. 3 through 6, there is shown an alternative embodiment of the magnetic coupling device wherein the magnetic flux produced by the centering magnetic induction circuit serves also to the transmission of the torque between the driving rotor 42 and the floating driven rotor 43. In this embodiment, identical or similar elements to those of the coupler illustrated in FIG. 1 or 2 are identified by the same numeral references.

Figures 3, 4:
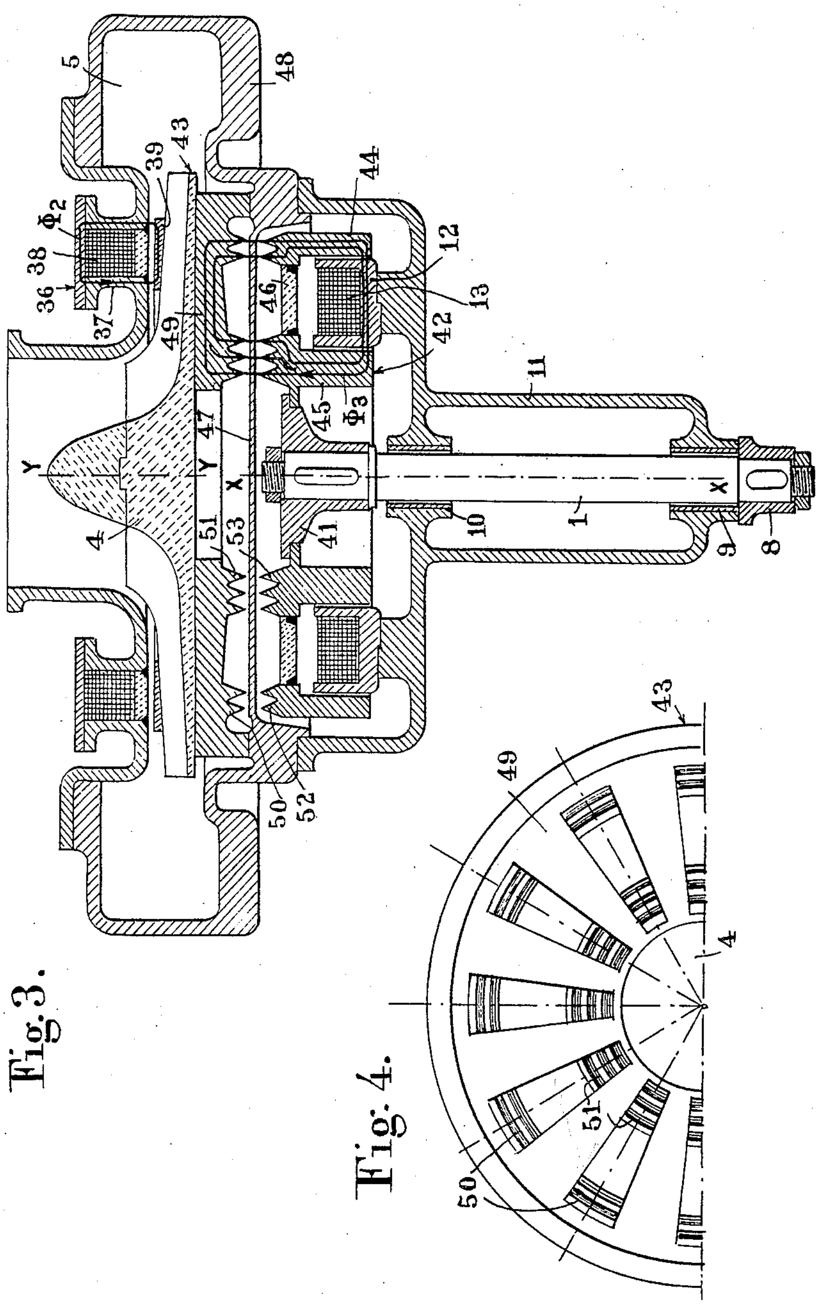
FIGURE 3 is a cross-sectional, longitudinal view of a modified embodiment of the electro-magnetic coupling device according to the invention.
FIGURE 4 is an elevational view of a half portion of the driven rotor of the coupler shown in FIG. 3.
Figure 5:
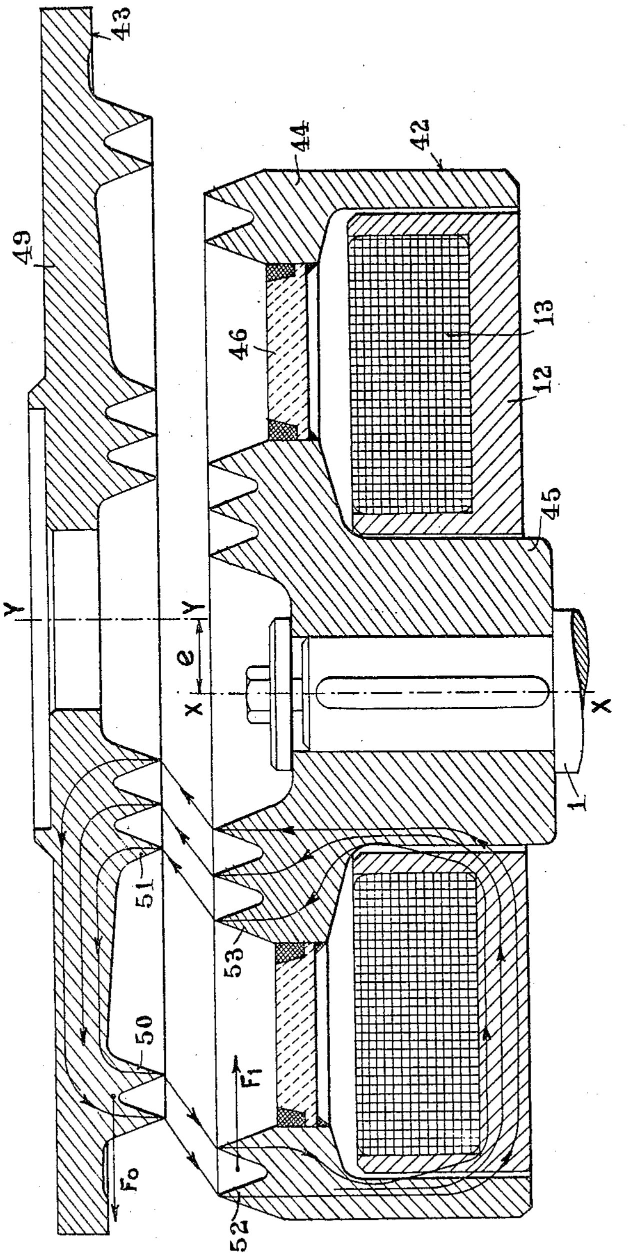
FIGURE 5 is a partial, longitudinal, cross-sectional view, on an enlarged scale, of the coupler illustrated in FIG. 3, assuming the driven rotor to be eccentered with respect to the driving rotor.
Figure 6:
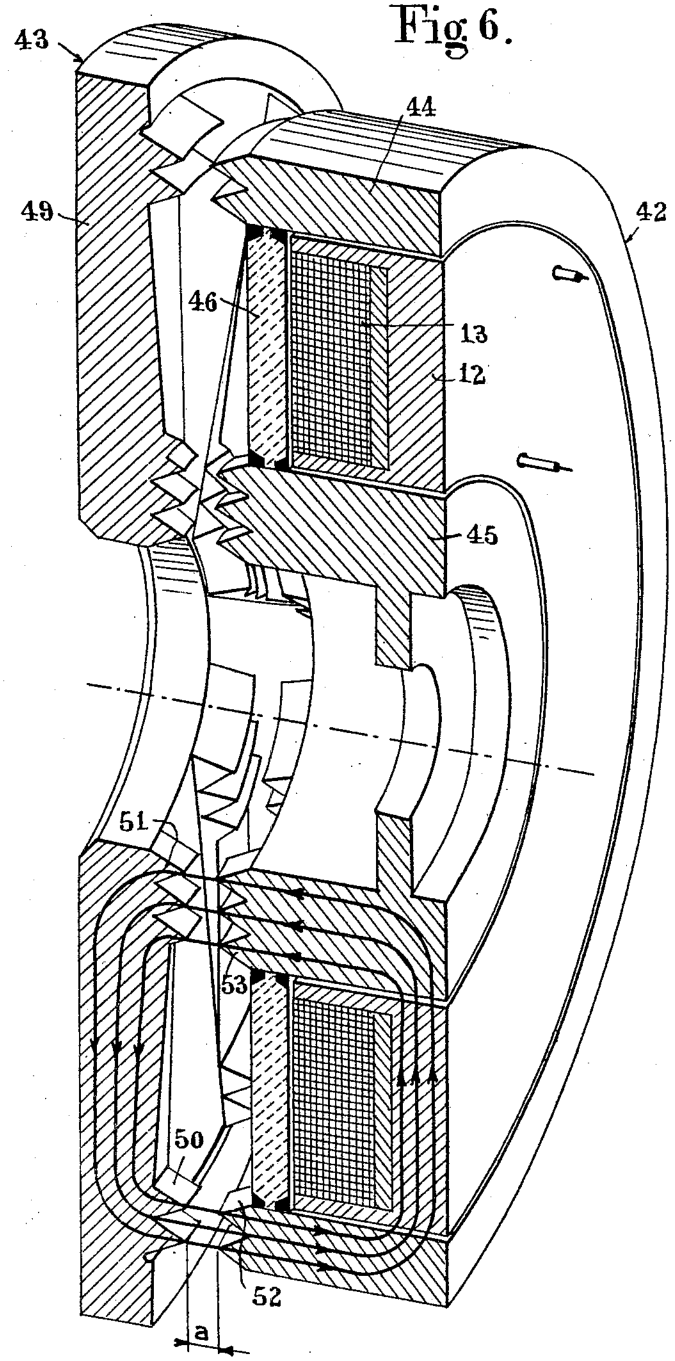
FIGURE 6 is a perspective view of the driving and driven rotors, respectively, and of the induction circuit of the coupler in FIG. 3, said elements being shown in a radial, cross-sectional plane.

In FIG. 3, the driving shaft 1 of the coupler carries a plate 41 keyed on one end, and on which are secured two axial rotor rings 44 and 45, of magnetic metal, interconnected through an annular cross-piece 46 of non-magnetic material.

Elements 41, 44, 45 and 46 constitute the driving rotor 42 and, in the annular space comprised between the rings 44 and 45, there is located the stationary annular magnetic circuit 12, carried by the envelope 11 of the machine and comprising inside thereof the field winding 13.

As in the first example, the driven rotor 43 is integrally linked with the operating member 4 of the machine and is located inside a sealed housing 5 which is bounded by envelope 48 and the tight separating partition 47.

The driven rotor 43 comprises a single magnetic circuit 49 consisting of an annular plate, the diameter of which is large with respect to the height and on which is secured the operating member of the machine.

The magnetic circuit 49 presents two sets of outer and inner teeth, 50 and 51, respectively, arranged around two rims concentric with the longitudinal axis Y—Y of the rotor. The teeth 50 and 51 derive from stamping out radial indentations in continuous rims, similar to the external rim 31 and internal rim 32 of the driven rotor 3 of the coupling device illustrated in FIGS. 1 and 2. Each tooth 50 of the outer rim is formed by two concentric ribs with sharp edges; similarly, each tooth 51 of the inner rim is formed of three concentric ribs, also provided with sharp edges. The outer and inner teeth, 50 and 51, respectively, are arranged in pairs, according to radii defining a constant angle, the sum of the lengths of the arcs which form the ribs of an outer tooth 50 being equal to the sum of the lengths of the arcs which constitute the ribs of the inner tooth 51, extending along the same radius. Thus, a constant cross-section for the passage of the magnetic flux $\Phi_3$ is obtained.

The driving rotor 42 is constituted, on the opposite side of the tight partition 47, in the same way as the driven rotor 49. The rings 44 and 45 are extended through pole teeth arranged around external and internal rims, respectively. The outer teeth 52 and the inner teeth 53 are arranged in the same way as the corresponding teeth 50 and 51 of the driven rotor 43. In this embodiment, the magnetic flux $\Phi_3$ generated by the field winding 13 closes through the rotor rings 44, 45 and the magnetic circuit 49, the flux being concentrated in the ribs of the inner teeth 53, 51 and the outer teeth 52, 50.

In operation, the position of the driven rotor 43 is defined by that furnishing the minimum reluctance of the magnetic circuit, i.e. when the edges of the ribs of teeth 50—53 are facing one another. The axis of rotation of the driven rotor 43 is thus defined by the magnetic connection with the driving rotor 42, the axis of said driving rotor 42 being physically defined by the bearings 9 and 10.

On the other hand, the respective coincident relationship of teeth 50, 51 with teeth 52, 53 defines the minimum reluctance position to which corresponds the synchronous transmission torque which, for given dimensions, is a function of the excitation intensity of the field winding 13.

It may also be said that the magnetic circuit thus constituted presents a minimum reluctance when the following three requirements are satisfied:

(1) Coincidence of axis Y—Y of the driven rotor 43 with the axis X—X of the driving rotor 42.

(2) Coincidence, on one hand, in mutual relation, of teeth 50 and 52 and, on the other hand, of teeth 51 and 53.

(3) Minimum spacing *a* (FIG. 6) between the edges of the teeth facing one another.

The tight partition 47 located between the driving rotor and the driven rotor being of a non-magnetic material, and of poor electrical conductivity, as soon as the field winding 13 is energized a magnetic field $\Phi_3$ develops along the areas of highest permeability. In order for the magnetic circuit reluctance to be a minimum, it is necessary that the axis X—X of rotor 42 and the axis Y—Y of rotor 43 should coincide. If a displacement *e* (FIG. 5) tends to occur between the axes X—X and Y—Y, magnetic return forces F0 and F1 urge rotors 43 and 42, respectively, and tend anyway to restore the coincidence relationship between the axes X—X and Y—Y.

As illustrated in the example of FIGS. 1 and 2, an auxiliary magnetic induction circuit 36 is provided in order to produce a magnetic flux $\Phi_2$ and compensate for the axial attraction performed by the centering magnetic induction circuit on the driven rotor 43.

In all the embodiments illustrated, the driven rotor 3 or 43 rotates upon being centered on the bearings 9 and 10, but without any physical connection therewith, the driving torque being a function of the excitation current flowing through the field winding 13.

The driven rotor 43 may therefore rotate inside any ambient medium, while being completely insulated from the outer medium. The centering bearings of rotor 43 are, in fact, constituted by the external bearings of the driving shaft 1.

It will be understood that the embodiments of the invention as described and illustrated hereinabove are given only by way of a non-limitative example, and that many modifications and variations may be carried out without departing from the spirit and scope of the invention.

Thus, the functions of the rotors may be reversed, the floating rotor being then the rotor of a turbine, driving the rotor integral with a generator. Also, while a flat air-gap has been provided for the torque transmission device, it is obvious that said transmission device may be established in the same way by means of a cylindrical air-gap.

In the embodiments illustrated in FIGS. 1 and 2, the magnetic circuit 17 carrying the teeth 18 and 19 may be substituted by a simple continuous plate or disc, coated with a conductive film, the driving operation being then carried out through eddy currents produced in the film.

It is also possible to provide, for the ribs constituting the various teeth and rims, various profiles, the essential requirement to be satisfied being that these ribs should carry sharp edges, in order to ensure a highly accurate positioning of both rotors with respect to one another.

What we claim is:

1. A device for mounting a floating rotor without shaft or bearing in a rotating machine revolving in unison with another rotor for transmitting a torque between said two rotors through a fluid-tight partition, comprising magnetic coupling means for transmitting said torque between said two rotors, axial thrust means for said floating rotor, a magnetic centering circuit coaxial and adjacent to said floating rotor, said magnetic circuit comprising a polar ring consisting of a plurality of concentric ribs ending with sharp edges, means for producing a magnetic flux in said magnetic centering circuit, said floating rotor comprising an annulus registering with said polar ring of said magnetic centering circuit, said rotor annulus consisting of a plurality of concentric ribs ending with sharp edges which are identical with those of said polar ring of said magnetic centering circuit, whereby the registering sharp edges of the adjacent ring and annulus of said magnetic centering circuit and said floating rotor are adapted, upon energization of said magnetic circuit, to concentrate the magnetic centering flux and therefore to keep said floating rotor strictly centered on the axis of symmetry of said magnetic centering circuit while dispensing with any mechanical bearing.

2. A device according to claim 1, comprising an auxiliary magnetic circuit exerting on said floating rotor an axial force opposite to that exercised by said centering magnetic circuit in order to balance and compensate for the axial attraction force exerted on said floating rotor by said centering magnetic circuit.

3. A device according to claim 2, wherein said floating rotor carries a ring of magnetic material facing said auxiliary magnetic circuit.

4. A device as set forth in claim 1, comprising a first annular magnetic circuit carried by said floating rotor and incorporating an annular set of teeth, a second annular magnetic circuit similar to said first annular magnetic circuit and carried by said other rotor, and means for producing a magnetic driving flux which completes its path through the annular set of teeth of said first and second magnetic circuits, whereby the torque is transmitted between said floating rotor and said other rotor.

5. A device according to claim 4, wherein the airgap between the magnetic circuits of both rotors ensuring the transmission of the torque is of flat configuration.

6. A device according to claim 4, wherein the airgap between the magnetic circuits of both rotors ensuring the transmission of the torque is of substantially cylindrical configuration.

7. A device according to claim 4, wherein the coupler is of the synchronous type, the two rotors having an equal number of teeth.

8. A device according to claim 4, wherein the coupler is of the non-synchronous type, both rotors having different numbers of teeth.

9. A device as set forth in claim 1, wherein said magnetic centering circuit is carried by said other rotor, and said registering sets of ribs carried by said rotors are formed by cutting radial grooves defining teeth for transmitting the torque, whereby the magnetic flux for centering said floating rotor is also used for transmitting the torque.

10. A device as set forth in claim 1, wherein said means for producing said magnetic flux are stationary.

References Cited in the file of this patent

UNITED STATES PATENTS 2,869,935 Milligan ---------------- Jan. 20, 1959

FOREIGN PATENTS 1,016,068 Germany ---------------- Sept. 19, 1957
1,074,010 Germany ---------------- Jan. 28, 1960
1,159,301 France ---------------- Feb. 10, 1958